Oct. 20, 1953 J. H. TINLOT 2,656,459

WIDE FREQUENCY COVERAGE BEACON RECEIVER

Filed Oct. 30, 1945

INVENTOR
JOHN H. TINLOT

BY Ralph L Chappell

ATTORNEY

Patented Oct. 20, 1953 2,656,459

UNITED STATES PATENT OFFICE 2,656,459

WIDE FREQUENCY COVERAGE BEACON RECEIVER

John H. Tinlot, Boston, Mass., assignor, by mesne assignments, to the United States of America as represented by the Secretary of the Navy Application October 30, 1945, Serial No. 625,663

7 Claims. (Cl. 250—20)

This invention relates to sensitive broad-band receivers in the microwave region, particularly to those used for radar beacon purposes.

Since it is necessary that radar beacons respond to all interrogating radars of a given radar band it is necessary that the receivers have wide-band frequency response characteristics. This is to allow for the frequency differences of individual magnetrons, and for the temperature drift of magnetrons under operation.

To meet these demands such beacon receivers have commonly been of the crystal-video type, being comprised of a crystal detector and a wide-band video amplifier. Such receivers have the necessary pass-band characteristics but have inherently low sensitivity, since the output of a crystal detector is much smaller than the output of the crystal mixer of a superheterodyne receiver. Since the receiver of the radar is of higher sensitivity, the useful range of the beacon system has heretofore been limited by the range at which the beacon could be interrogated.

It has previously been impractical to make use of the added sensitivity of a superheterodyne receiver for radar beacons because of its narrow pass-band. The range of frequencies to which a superheterodyne receiver is sensitive is fixed by the pass-band of the I. F. (intermediate frequency) amplifier. Although it is possible to construct an I. F. amplifier sufficiently broad to cover the necessary band, this is found to be clumsy and unsuitable for lightweight portable equipments.

Accordingly, it is an object of this invention to provide a superheterodyne receiver having a broad reception band.

It is also the object of this invention to provide a superheterodyne receiver the I. F. amplifier of which consists of stages with video type coupling circuits or any other arrangement to provide a broad pass band.

It is also the object of this invention to provide a superheterodyne receiver the local oscillator of which is modulated by a high frequency oscillator, thus providing virtual local oscillators at the sideband frequencies generated by this modulation.

It is further the object of this invention to provide a superheterodyne receiver in which the frequency of the local oscillator is varied periodically to improve the sensitivity in the null regions which would exist in the immediate neighborhood of the frequencies of the local oscillator and of the side bands generated by the high frequency modulation.

Figure 1:
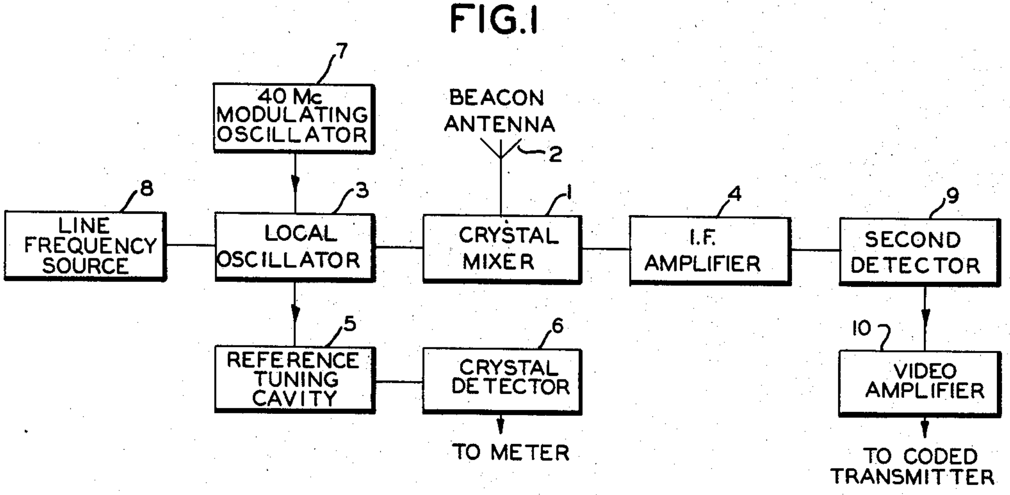
Figure 2:
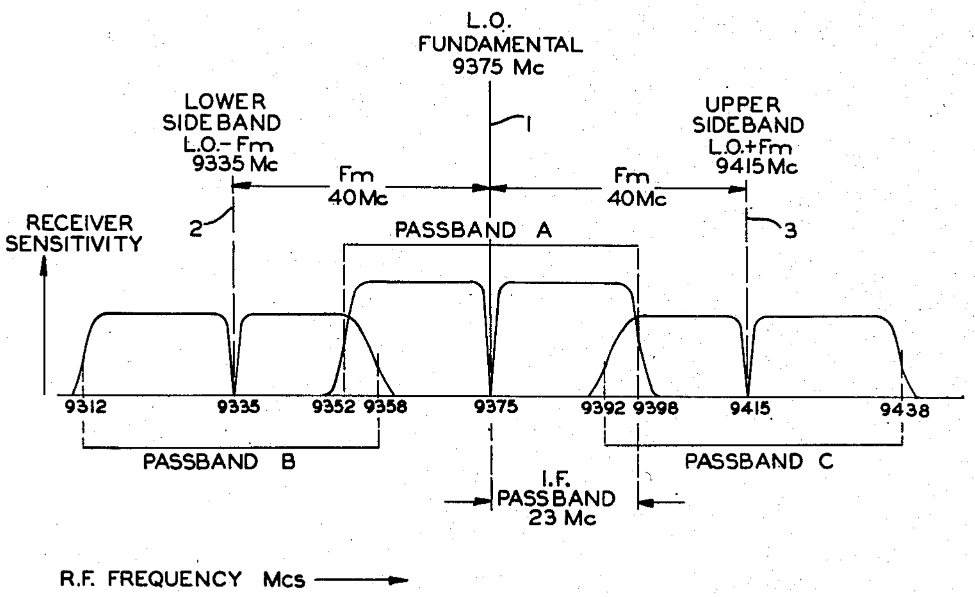

A more complete understanding of the invention may be had by reference to the drawing of which Fig. 1 is a block diagram of an embodiment of this invention and Fig. 2 is a diagram showing the R. F. (radio frequency) spectrum covered by this embodiment.

In the following description of the operation of a preferred embodiment of the invention, use will be made of the terms "lower" and "upper half-power frequency" to identify those signal frequencies in the intermediate frequency band of the amplifier whereat the power gain is one-half the optimum gain. By considering these half-power frequencies as the effective cutoff frequencies of the amplifier, the latter's band-width may be precisely defined as the upper half-power frequency minus the lower half-power frequency. In the illustration represented by Fig. 2, the band-width corresponds to 23 m. c. p. s.—200 k. c. p. s.

Referring to Fig. 2 assume a receiver consisting of a normal video amplifier fed by an intermediate frequency amplifier made up of broad-banded video type stages such that the lower and upper half-power frequencies of this I. F. amplifier are 200 k. c. p. s. (kilocycles per second) and 23 m. c. p. s. (megacycles per second) respectively. This I. F. amplifier is fed by a mixer stage which has inputs from an antenna and from three local oscillators, these oscillators differing in frequency by an amount $F_m$, here 40 m. c. p. s. In Fig. 2 let line 1 represent the frequency of the medium frequency local oscillator, and assume this frequency to be 9375 m. c. p. s. Line 2 will represent the frequency of the lowest frequency local oscillator, which being less than that of the first by $F_m$, or 40 m. c. p. s., will be 9335 m. c. p. s. Correspondingly let line 3 represent the frequency of the third local oscillator, which being greater than that of the first by 40 m. c. p. s., is equal to 9415 m. c. p. s. With such a receiver all radio frequency signals reaching the mixer, and having frequencies between 9352 and 9398 m. c. p. s., will be combined by the mixer with the output of the first local oscillator, 9375 m. c. p. s., to produce signals having frequencies between 0 and 23 m. c. p. s. Since these signals do not exceed in frequency the upper half power frequency of the I. F. amplifier, they will be amplified by the I. F. amplifier and passed on as signals to the second detector 9. The frequency band between 9352 m. c. p. s. and 9398 m. c. p. s. is therefore shown as pass-band A on Fig. 2.

In the same fashion all signals reaching the mixer from the antenna having radio frequencies between 9312 m. c. p. s. and 9358 m. c. p. s. will be combined with the output of the second local oscillator, at 9335 m. c. p. s., to produce signals having frequencies of 23 m. c. p. s. or less. These signals will be amplified by the I. F. amplifier so this frequency band from 9312 to 9358 m. c. p. s. has been shown on Fig. 2 as pass-band B.

Likewise all R. F. signals to the mixer in the frequency range 9392 to 9438 m. c. p. s. will be combined with the output of the third local oscillator, at 9415 m. c. p. s., to produce signals having frequencies of 23 m. c. p. s. or less. These signals will be accepted by the I. F. amplifier and the frequency band between 9392 m. c. p. s. and 9438 m. c. p. s. has correspondingly been shown on Fig. 2 as pass-band C.

It can thus be seen that all R. F. signals from the antenna to the mixer having frequencies in the range from 9312 to 9438 m. c. p. s. will produce signals which will be amplified by the I. F. amplifier. Hence, the total pass-band of the receiver will be 126 m. c. p. s.

It will be noted that for signal frequencies differing from one of the local oscillator frequencies by not more than 200 kilocycles the output of the mixer will have a frequency of 200 kilocycles or less. Since the frequencies of these signals lie below the lower half power point of the I. F. amplifier, this receiver will have sensitivity nulls, approximately 400 kilocycles wide, centered about the three local oscillator frequencies.

Fig. 1 now provides a block diagram of a practical receiving system to accomplish what has been described with reference to Fig. 2. The components indicated by the blocks are in common use, and several varieties of each will suggest themselves to those skilled in the art.

The mixer 1, here a crystal, receives signals from the beacon antenna 2, as a source of radio frequency signals, and the local oscillator 3, combining these signals to obtain the I. F. signals which are fed to the I. F. amplifier 4. The I. F. amplifier 4 is made up of stages employing video type coupling circuits (instead of the usual tuned circuits), here having a pass-band between half power points from 200 kilocycles to about 23 megacycles. A second output from the local oscillator 3 feeds reference tuning cavity 5, which is used with crystal detector 6 to indicate proper tuning of the local oscillator 3. A maximum output from crystal detector 6 will indicate that the local oscillator is tuned to the frequency of reference cavity 5, here 9375 m. c. p. s. Once the local oscillator 3 has been properly tuned to the center frequency, the signal from the local oscillator 3 is heterodyned with the output of an oscillator 7, having a frequency of say 40 m. c. p. s.

Local oscillator 3 may be a reflex cavity resonator type oscillator in which case the heterodyning may be accomplished, for example, by applying the signal from oscillator 7 to the reflector of the local oscillator tube. Such heterodyning results in the generation of sidebands in the output of the local oscillator 3. These sidebands will be equal to the center frequency of the local oscillator 3, plus the modulating frequency, and equal to the center frequency less the modulating frequency. Here these sidebands would have frequencies of 9415 and 9335 m. c. p. s. respectively. The output of local oscillator 3 to mixer 1 will consist of three principal frequencies, 9335 m. c. p. s., 9375 m. c. p. s. and 9415 m. c. p. s. These are just the conditions which were assumed to exist in the above discussion with reference to Fig. 2. Consequently, the embodiment of the invention shown in Fig. 1 will have a total frequency coverage of 126 m. c. p. s.

It was noted in the discussion of Fig. 2 that there would be sensitivity nulls centered at the local oscillator frequency and at the upper and lower sideband frequencies. In radar beacon applications some signal would be obtained in these regions as the width of the spectrum of the interrogating radar is in excess of 0.5 m. c. p. s. However, it is possible to improve the sensitivity in these regions by slowly varying the reflector voltage of the local oscillator 3 by an amount sufficient to change the frequency of the local oscillator 3 by 2 to 4 m. c. p. s. This would result in a jittering of the local oscillator frequency and its sidebands slowly up and down, thus filling in the nulls which would otherwise exist. A means to accomplish this has been shown in Fig. 1, as a line frequency source 8, which could be a tap from the transformer supplying the filaments of the receiver.

It will also be noted that there exist two regions where the pass-bands due to the three local oscillator frequencies overlap; in our example 9352 to 9358 m. c. p. s. and 9392 to 9398 m. c. p. s. It has been established that these regions of overlap cause no confusion where the output of the receiver is used only to trigger the further stages as in a radar beacon.

The use of specific frequencies in the above description should not be understood as limiting the application of the invention, as it will be apparent to one skilled in the art that various changes and modifications may be made in the above-described preferred embodiment of the invention without departing from the scope of the invention.

I claim:

1. A broad band radio receiver comprising an intermediate frequency amplifier having a frequency response characteristic wherein the power gain at a preselected upper frequency $f_h$ is one-half the optimum gain, means for simultaneously generating a preselected number of local oscillations differing in frequency by substantially twice the frequency of $f_h$, a mixer for simultaneously heterodyning received radio frequencies with all of said local oscillations, and means coupling the output of said mixer to said intermediate frequency amplifier whereby the frequency range of radio signals that may be amplified by said receiver is substantially equal to twice said preselected upper frequency $f_h$ multiplied by said preselected number of local oscillations.

2. A broad band radio receiver comprising an intermediate frequency amplifier having a frequency response characteristic wherein the power gain at a preselected upper frequency $f_h$ and at a preselected lower frequency $f_L$ is one-half the optimum gain, means for simultaneously generating a preselected number of local oscillations differing in frequency by substantially twice the upper frequency $f_h$ of said amplifier, a mixer for heterodyning received radio frequencies with said local oscillations, means coupling the output of said mixer to said intermediate frequency amplifier whereby the frequency range of said radio frequency signals that may be amplified by said receiver is substantially equal to twice said preselected upper frequency $f_h$ multiplied by said preselected number of local oscillations and means for periodically varying the frequency of said local oscillations by an amount at least as great as said preselected lower frequency $f_L$ of said amplifier whereby nulls in said frequency range are eliminated.

3. A broad band radio receiver comprising an intermediate frequency amplifier having a frequency response characteristic wherein the power gain at a preselected upper frequency $f_h$ and at a preselected lower frequency $f_L$ is one-half the optimum gain, means for generating a first local oscillation having a frequency $f_1$, means for simultaneously generating second and third local oscillations having frequencies $f_2$ and $f_3$ respectively, said frequencies $f_2$ and $f_3$ being related to the frequency $f_1$ substantially in accordance with the following relationships:

$$f_2=f_1-2f_h$$

and $$f_3=f_1+2f_h$$

a mixer, means for receiving radio frequency signals, means coupling said means for generating said three local oscillations and said signal receiving means to said mixer thereby to heterodyne simultaneously said three local oscillations and received radio signals and means coupling the output of said mixer to said intermediate frequency amplifier.

4. A receiver as in claim 3, said receiver further comprising means for periodically varying the frequency of said three local oscillations over a range at least as great as $\pm f_L$.

5. A broad band receiver comprising an intermediate frequency amplifier having a frequency response characteristic wherein the power gain at a preselected upper frequency $f_h$ and at a preselected lower frequency $f_L$ is one-half the optimum gain, a first oscillator for generating a frequency $f_1$, a second oscillator for generating a frequency $f_2$ substantially equal to $2f_h$, means for heterodyning signals from said two oscillators to obtain signals having frequencies $f_3$ and $f_4$ where $f_3$ and $f_4$ are related to $f_1$ substantially in accordance with the following relationship:

$$f_3=f_1-f_2$$
$$f_4=f_1+f_2$$

an antenna for receiving radio signals, a heterodyne mixer, means for applying said signals having frequencies $f_1$, $f_3$, and $f_4$ and received radio signals to said heterodyne mixer whereby signals derived from radio signals lying within the following ranges: $(f_1 \pm f_h)$, $(f_3 \pm f_h)$, and $(f_4 \pm f_h)$ are passed by said amplifier.

6. A receiver in accordance with claim 5 wherein said receiver further comprising means for periodically sweeping the frequency $f_1$ of said first oscillator over a range substantially equal to $\pm f_L$ whereby the frequency range within which radio signals may be received is substantially continuous from a frequency $(f_3-f_h)$ to a frequency $(f_4+f_h)$.

7. A broad band receiver comprising an intermediate frequency amplifier having a frequency response characteristic wherein the power gain at a preselected upper frequency $f_h$ and at a preselected lower frequency $f_L$ is one-half the optimum gain, a first oscillator for generating a frequency $f_1$, means for periodically sweeping the frequency $f_1$ over a range at least as great as $\pm f_L$, a second oscillator for generating frequency $f_2$ where $f_2$ is substantially equal to $2f_h$, means for heterodyning signals from said two oscillators to obtain signals having frequencies $f_3$ and $f_4$ where $f_3$ and $f_4$ are related to $f_1$ substantially in accordance with the following relationships:

$$f_3=f_1-f_2$$
$$f_4=f_1+f_2$$

an antenna for receiving radio signals, a heterodyne mixer, means for applying said signals having frequencies $f_1$, $f_3$ and $f_4$ and received radio signals to said heterodyne mixer, a second detector coupled to said intermediate frequency amplifier, and means for amplifying the output of said detector.

JOHN H. TINLOT.

References Cited in the file of this patent

UNITED STATES PATENTS

| Number | Name | Date |
|---|---|---|
| 1,674,696 | Ohl | June 26, 1928 |
| 1,830,242 | Ranger | Nov. 3, 1931 |
| 1,969,903 | Roberts | Aug. 14, 1934 |
| 2,026,759 | Turner | Jan. 7, 1936 |
| 2,038,938 | Kirkwood | Apr. 28, 1936 |
| 2,055,737 | Terman | Sept. 29, 1936 |
| 2,228,815 | Deerhake | Jan. 14, 1941 |
| 2,269,654 | Foster | Jan. 13, 1942 |
| 2,400,133 | Pray | May 14, 1946 |
| 2,448,055 | Silver | Aug. 31, 1948 |
| 2,460,900 | Newbold | Feb. 8, 1949 |
| 2,465,341 | Altovsky | Mar. 29, 1949 |

FOREIGN PATENTS

| Number | Country | Date |
|---|---|---|
| 414,769 | Great Britain | Aug. 13, 1934 |